United States Patent

Kim

[11] Patent Number: 6,144,655
[45] Date of Patent: Nov. 7, 2000

[54] VOICE INFORMATION BILATERAL RECORDING METHOD IN MOBILE TERMINAL EQUIPMENT

[75] Inventor: Dae-Hyeon Kim, Kyungki-do, Rep. of Korea

[73] Assignee: LG Information & Communications, Ltd., Seoul, Rep. of Korea

[21] Appl. No.: 08/960,430

[22] Filed: Oct. 29, 1997

[30] Foreign Application Priority Data

Oct. 30, 1996 [KR] Rep. of Korea ............... 96-49940

[51] Int. Cl.[7] ............... H04B 7/216; H04J 3/00
[52] U.S. Cl. ............... 370/342; 370/335; 370/345
[58] Field of Search ............... 704/221, 222, 704/223, 219, 220; 375/246, 253; 370/335, 342, 345, 365, 477, 468

[56] References Cited

U.S. PATENT DOCUMENTS 5,926,786  7/1999  McDonough et al. .
6,014,618  1/2000  Patel et al. ............... 704/207

Primary Examiner—Chi H. Pham
Assistant Examiner—Brenda H. Pham
Attorney, Agent, or Firm—Fleshner & Kim, LLP

[57] ABSTRACT

A voice information bilateral recording method in a mobile terminal equipment includes the steps of: forming a speech path between the mobile terminal equipments to transmit/receive voice information; executing equalization during a predetermined time period by using a weighted value for a variable data rate of the transmitted/received voice information to thereby calculate a frequency rate of the variable data rate of the transmitted/received voice information; and recording the voice information by using the calculated frequency rate.

17 Claims, 3 Drawing Sheets

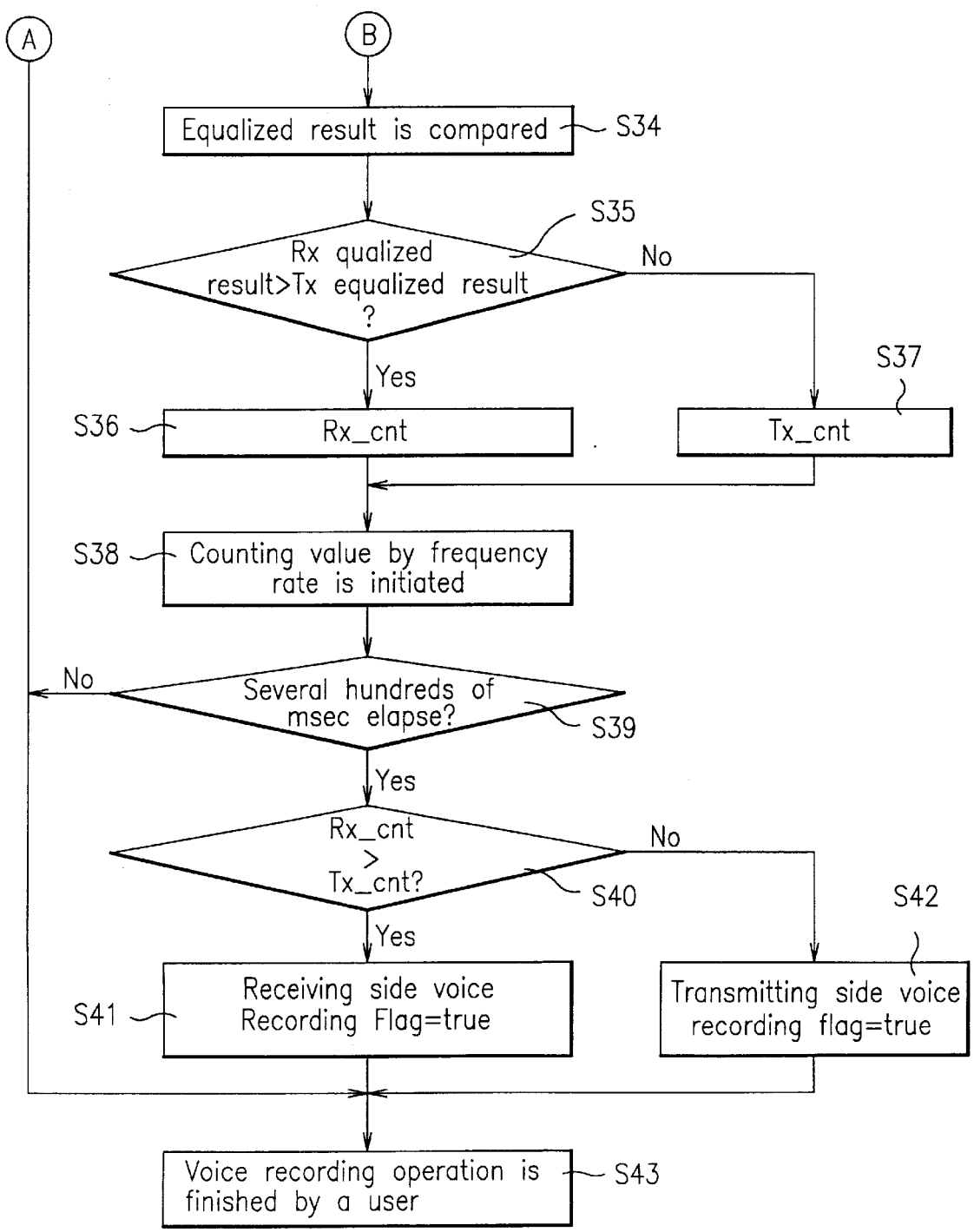

VOICE INFORMATION BILATERAL RECORDING METHOD IN MOBILE TERMINAL EQUIPMENT

BACKGROUND OF THE INVENTION

1. Field of the Invention

The present invention relates to a code division multiple access (CDMA) mobile communication system, and more particularly, to a voice information bilateral recording method in a mobile terminal equipment by using a frequency rate, a weighted value and an equalization operation of voice data during communication with an arbitrary counterpart in a state where a speech path is formed.

2. Discussion of Related Art

Generally, to transmit voice information between a transmitting side and a receiving side in mobile communication systems or voice information memory systems, a voice information memory method using a pulse code modulation (PCM) method which stores the voice information of all of the transmitting and receiving sides has been embodied. The voice information memory method stores all information transmitted on a speech path by a quantizing method of the voice information such as, for example, a noise generated due to surrounding environment factors, a cross voice on the speech path, or a noise within a communication system, including real voice information between the transmitting/receiving sides.

An example of the voice information memory method is an adaptive differential pulse code modulation (ADPCM) method in which voice information is recorded as pulse code modulation (PCM) data. Since the ADPCM method should occupy a large memory size, however, a high efficiency of the voice data recording can not be expected. The voice information recording method during communication in the ADPCM manner records the PCM format information for a short voice signal in a memory.

Therefore, since a voice information recording method in a conventional mobile terminal equipment is under the limitation of a memory in accordance with transmitting/receiving time of voice information or data size of information quantity, there occurs a problem in that a high efficiency of voice information recording is not achieved.

SUMMARY OF THE INVENTION

Accordingly, the present invention is directed to a voice information bilateral recording method in a mobile terminal equipment that substantially obviates one or more of the problems due to limitations and disadvantages of the related art.

An object of the invention is to provide a voice information bilateral recording method in a mobile terminal equipment which quantizies transmitted/received voice information by using a vocorder algorithm, extracts a variable data rate varied according to each voice information by using compressed voice information, and checking a master speech path of the transmitted/received voice information, to thereby record the checked voice information.

To accomplish this and other objects of the present invention, a voice information bilateral recording method in a mobile terminal equipment includes the steps of: quantizing voice information in a state where a user sets speech path in a CDMA mobile communication system and generating compressed voice information; extracting a variable data rate by using the generated voice information; discarding a part in which the voice information is not contained in the extracted variable data rate; calculating a weighted value and executing operation by using the variable data rate corresponding to the voice information; determining a master speech path of current voice information transmitted/received; and recording the compressed voice information.

In the preferred embodiment of the present invention, a high weighted value is assigned to the master speech path, but a low weighted value is assigned to the other speech path. As a result, even in a relative shortest time period (about 20 msec), a current master speech path can be determined.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIG. 1 is a flow chart illustrating a voice information bilateral recording method in a mobile terminal equipment according to the present invention; and FIG. 2 is a detailed flow chart illustrating an equalization step of FIG. 1.

DETAILED DESCRIPTION OF PREFERRED EMBODIMENT

Reference will now be made in detail to the preferred embodiments of the present invention, examples of which are illustrated in the accompanying drawings.

Figure 1:
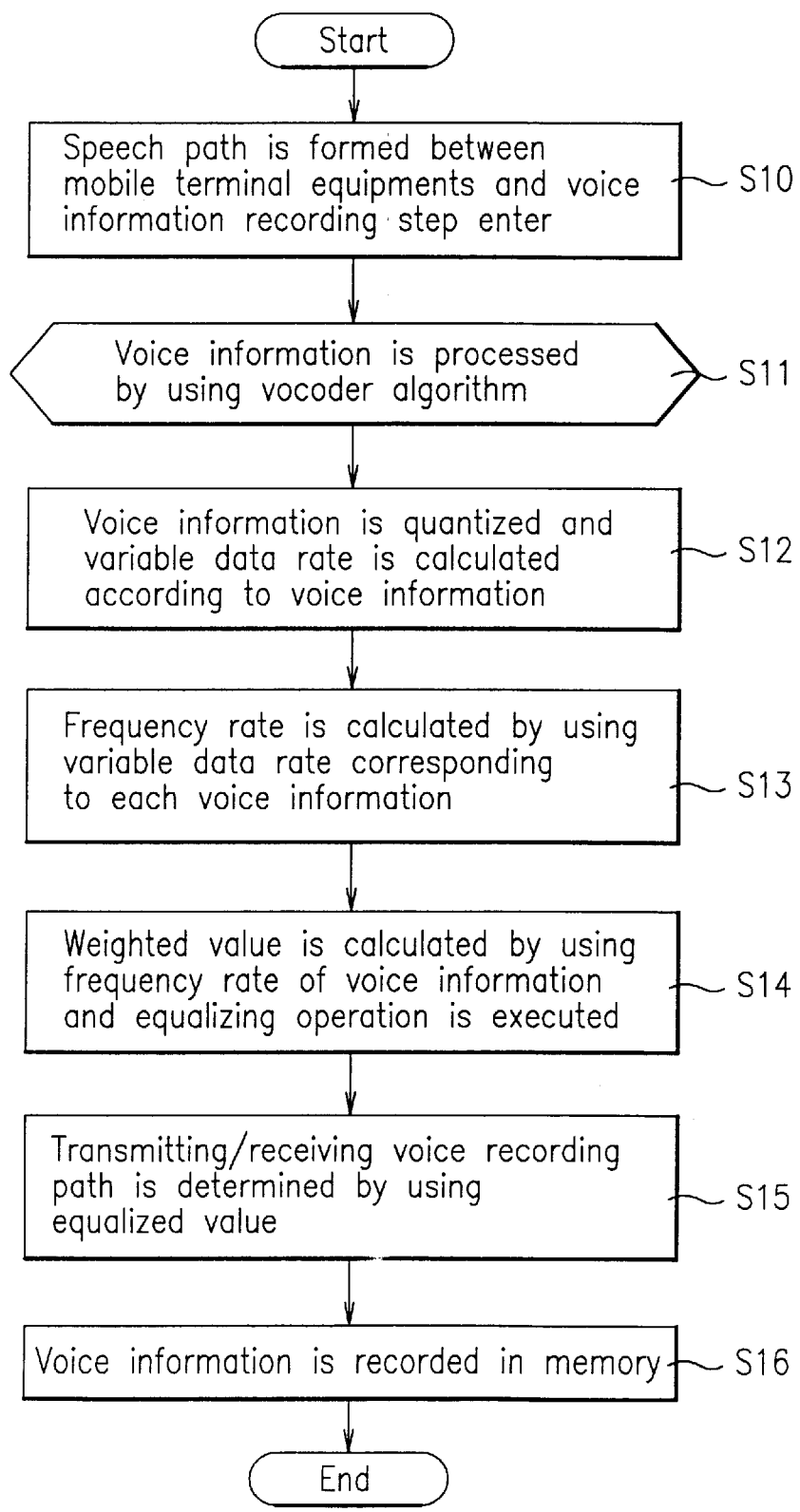
Figure 2:
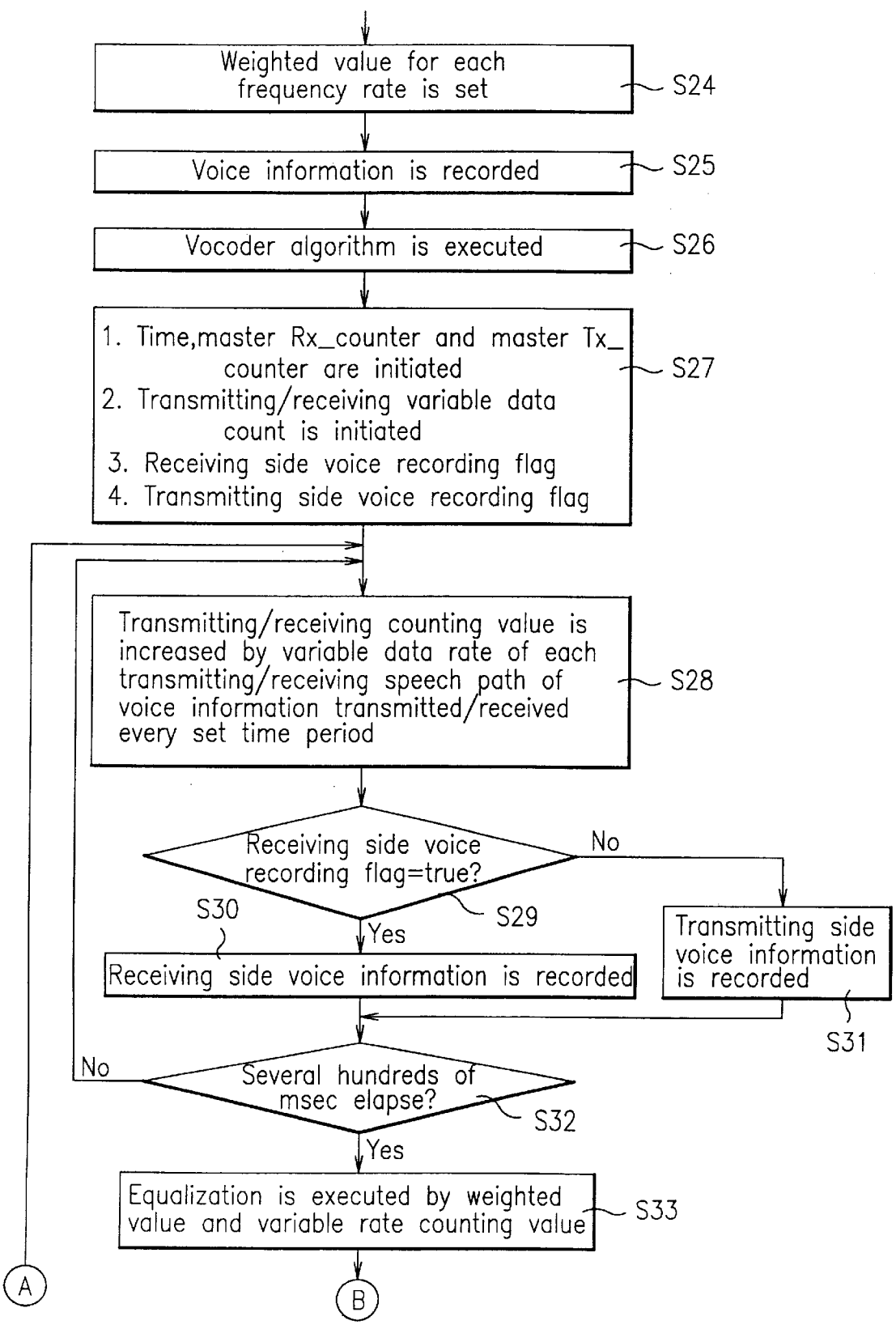

FIG. 1 is a flow chart illustrating a voice information bilateral recording method in a mobile terminal equipment according to the present invention, and FIG. 2 is a detailed flow chart illustrating an equalization step of FIG. 1.

A voice information bilateral recording method according to the present invention comprises the steps of: extracting a voice rate and voice data by using a vocorder algorithm in a state where a voice communication is made; and determining a current master speech subject by using a variable data rate of voice information and a frequency rate of the variable data rate. In this case, in the determining step of the current master speech subject the voice information transmitted/received is generated as a constant voice rate by the vocorder algorithm, and the constant voice rate is calculated by using a weighted value in an equalizing step(a step of calculating a weighted value and a specific time according to the voice data rate). At the time, after the equalizing step, the transmitted/received voice information is determined as a master speech subject according to the variable data rate.

In a voice information bilateral recording method in a mobile terminal equipment according to the present invention, as shown in FIG. 1, at step S10 a speech path is formed between mobile terminal equipments and a voice information recording step enters. Then, at step S11 voice information is processed by using a vocorder algorithm for quantizing the voice information. At the time, in the mobile terminal equipment using the CDMA, a code excited linear predictive (CELP) method is embodied. Since in the CELP method the voice information can be easily compressed, the CELP method can reduce an amount of compressed information, as compared with the PCM method.

After the execution of vocorder algorithm, at step S12 a variable data rate according to the quantization of the voice information and the voice information can be calculated.

Next, after the variable data rate is calculated at the step S12 according to current voice information of the transmitted/received voice information, at step S13 a frequency rate during a predetermined time period of the transmitted/received voice information is calculated by using the variable data rate.

Then, at step S14 a weighted value determined for the variable data rate is calculated by using the frequency rate of the variable data rate and an equalizing operation during a predetermined time period of the transmitting/receiving voice information is executed. That is, a value calculated by using the determined weighted value of the variable data rate is converted into a percentage.

By using the converted value into the percentage, at step S15 a transmitting/receiving voice recording path for a master speech path during a predetermined time period is determined, and at step S16 the voice information of the determined speech path is recorded.

An explanation of operation and effect of the voice information bilateral recording method in the mobile terminal equipment according to the present invention will be in detail discussed with reference to FIG. 2.

Firstly, at step S24 the weighted value for each of frequency rates of the variable data rate of the transmitted/received voice information is determined as shown in Table <1>.

TABLE 1

| Variable Data Rate | 14400/9600 bps | 7200/4800 bps | 3600/2400 bps | 1800/1200 bps |
|---|---|---|---|---|
| Weighted Value (100%) | 65% | 25% | 10% | 0% |

These weighted values are arbitrarily established values, and in case of the variable data rate of 14400/9600 bps, a highest weighted value is assigned. In more detail, in case of a high variable data rate, the voice information in the CDMA mobile communication system is contained, but in case of a low variable data rate, the voice information is not contained. Therefore, the weighted value in the lowest variable data rate of 1800/1200 bps is set as 0%. In other words, in case of the weighted value of 0%, it is a mute state in the state where the speech path is formed. Thereafter, a voice information storing state starts in the mobile communication system or the voice information memory system, at step S25. Then, at step S26 the voice information transmitted/received is quantized every a specific time, for example, several tens of msec, by using a vocorder algorithm and the variable data rate for the voice information is calculated. This step uses the CELP method in the CDMA manner. An initialization step for basic initial variable values is executed. In other words, at step S27 a receiving side voice recording flag, a transmitting side voice recording flag and a frequency rate of the variable data rate after transmitting/receiving the voice information during a predetermined time period a re calculated, a recording time is set, and equalization values after the established time at an initial state elapses are compared, to thereby initiate a master transmitting/receiving speech path counting during a predetermined time period.

Next, at step S28 a vocorder algorithm is executed in each transmitting/receiving speech path every a predetermined time and a count value is increased by the variable data rate of the voice information on the basis of quanitized voice information. In other words, the transmitting/receiving counting values are increased by the variable data rate of each transmitting/receiving speech path of the voice information transmitted/received. At step S28 each variable data rate corresponds to 14400/9600 bps, 7200/4800 bps, 3600/2400 bps and 1800/1200 bps. Generally, in the CDMA mobile communication system the counting value is increased, based upon the variable data rate, but in other mobile communication systems it is based upon another type of data rate.

After execution of the steps S27 and S28, at step S29 if the receiving side voice recording flag informing a current master speech path in current transmitted/received voice information is true, at step S30 the receiving side voice information is recorded, but at the step S29 if the receiving side voice recording flag is fall, at step S31 the transmitting side voice information is recorded.

In case of an initial communication state, since the current master speech path is not checked, an initial voice recording flag initiates the transmitting side voice recording flag as "true". Next, it is determined whether several hundreds of msec elapse at step S32, and if does not elapse, the steps S28 and 29 are repeated. However, if so, the variable data rate in the transmitted/received voice information by each set time is calculated to increase the counting value by the transmitting/receiving speech path.

At step S33 an equalization step is executed to convert the counting value into a percentage of the transmitting/receiving speech path by using the variable rate counting value by the transmitting/receiving speech path and the weighted value set in the initial step S24. At step S34 the calculated equalized result is compared with the transmitted/received voice information during the several hundreds of msec. Next, at step S35 it is determined whether an equalized value of the received voice information Rx as the compared result of the step S34 is larger than that of the transmitted voice information Tx.

Then, at steps S36 and S37, a master speech path counting value for the larger equalized value among the transmitted/receiving voice information is increased.

On the other hand, at the step 31 a current master speech path during the determined time period is determined, and the steps 32 to S38 are repeated during the set time period. This reason is to prevent the speech path from being changed during a shortest time period. To this end, at the step S38 the transmitting/receiving variable data rate counting value set in the initial state is initiated.

Next, at step S39 it is determined whether a set time period(several hundreds of msec) elapses, and if elapses, at step S40 the master transmitting/receiving speech path counting values are compared in the time point. Based upon the compared result of the step S40, the master transmitting speech path count Tx_cnt or the master receiving speech path count Rx_cnt is determined. In case of the master transmitting speech path count Tx_cnt, at step S41 the receiving side voice recording flag_flag is displayed with "true", and in case of the master receiving speech path count Rx_cnt, at step S42 the transmitting side voice recording flag_flag is displayed with "true".

The above steps are repeated to record in a memory the continued transmitting/receiving voice information according to the master speech path during a predetermined time period. Finally, in case of completing the steps S41 and S42, at step S43 the recording operation of the voice information is finished by a user.

As clearly apparent from the foregoing, a voice information bilateral recording method in a mobile terminal equipment according to the present invention calculates a variable data rate of voice information by using a mobile communication system or a voice information memory system to thereby determine a master transmitting/receiving speech path, such that the voice information during communication is efficiently stored and a great large amount of voice information is recorded in a small memory size.

Furthermore, a voice information bilateral recording method in a mobile terminal equipment according to the present invention determines a speech subject of voice information transmitted/received according to a variable data rate of a vocorder algorithm by using a frequency rate during a specific time period and excludes a non-voice interval from the speech subject, such that the voice information is efficiently recorded and easiness of usage of the mobile communication system is provided.

It will be apparent to those skilled in the art that various modifications and variations can be made in a voice information bilateral recording method in a mobile terminal equipment of the present invention without departing from the spirit or scope of the invention. Thus, it is intended that the present invention cover the modifications and variations of this invention provided they come within the scope of the appended claims and their equivalents.

What is claimed is:

1. A voice information bilateral recording method in mobile terminal equipment, said method comprising the steps of:

transmitting/receiving voice information after forming a speech path between the mobile terminal equipments;

determining a variable data rate of the transmitted/received voice information using vocoding algorithm;

calculating a frequency rate of the variable data rate corresponding to each voice information during a predetermined time period;

executing equalization of the frequency rate of the variable data rate by using a weighted value thereby calculating a equalization value;

selecting a speech path for transmission or a speech path for reception, according to the equalization value; and recording the voice information through the selected speech path.

2. The method as defined in claim 1, wherein said recording step compresses the voice information by using a vocorder algorithm and records the compressed voice information.

3. The method as defined in claim 1, wherein said weighted value is 65% for a variable data rate of 14400/9600 bps, 25% for a variable data rate of 7200/4800 bps, 10% for a variable data rate of 3600/2400 bps and 0% for a variable data rate of 1800/1200 bps, respectively.

4. A voice information bilateral recording method in mobile terminal equipment, said method comprising the steps of:

transmitting/receiving voice information after forming a speech path between the mobile terminal equipments;

generating compressed voice information by quantizing voice information transmitted/received through the speech path;

determining a variable data rate using the generated voice information;

excluding a part of the variable data rate in which the voice information is not contained;

calculating a weighted value and executing an equalization operation using the variable data rate corresponding to the voice information and the weighted value to determine an equalization value;

selecting a master speech path for current voice information transmitted/received, according to the equalization value; and recording compressed voice information through the master speech path.

5. The method as defined in claim 4, wherein said voice information is transmitted/received in a code division multiple access mobile communication system.

6. The method as defined in claim 4, wherein said voice information recording step is determined under selection of a user.

7. The method as defined in claim 4, wherein said equalization operation step quantizes the voice information by using a vocorder algorithm of the voice information transmitted/received during a predetermined set time period and calculates the variable data rate of each of the voice information.

8. The method as defined in claim 7, wherein said equalization operation step initiates a master receiving voice information counter, a master transmitting voice information counter and transmitting/receiving variable data rate counter after the execution of the vocorder algorithm and generates a receiving side recording flag and a transmitting side recording flag.

9. The method as defined in claim 8, wherein said equalization operation step further comprises the step of discriminating a voice recording flag, as a count value of the variable data rate of the voice information is increased by each of variable data rate of master transmitting/receiving speech paths.

10. The method as defined in claim 9, wherein said voice recording flag discriminating step records receiving side voice information, if the voice recording flag corresponds to a receiving side voice information recording flag, and records transmitting side voice information, if the voice recording flag corresponds to a transmitting side voice information recording flag.

11. The method as defined in claim 10, wherein said voice information recording step is repeated, while increasing the count value by each of the variable data rate, if a predetermined time period does not elapse.

12. The method as defined in claim 11, wherein said voice information recording step proceeds to the equalization operation by using the weighted value and a count value by each frequency rate, if the predetermined time period elapses.

13. The method as defined in claim 12, wherein said equalization operation step compares an equalized value of a master received voice information with that of a master transmitted voice information to thereby increase a master speech path counting value for the larger equalized value among the transmitted/receiving voice information equalized values, and is repeated during a predetermined set time period.

14. The method as defined in claim 13, wherein said equalization operation step initiates a counting value by frequency rate, and if a set time period elapses, compares the master transmitting/receiving speech path counting values to thereby determine a master transmitting speech path or a master receiving speech path.

15. The method as defined in claim 13, wherein said equalization operation step is repeated if the set time period does not elapse.

16. The method as defined in claim 13, wherein said equalization operation step displays the receiving side voice information recording flag as "true" in case of the master transmitting speech path and displays the transmitting side voice information recording flag as "true" in case of the master receiving speech path.

17. The method as defined in claim 13, wherein said voice information in a priority order is recorded in a memory according to the master speech path.

* * * * *